United States Patent [19]

Maeda et al.

[11] Patent Number: 4,554,652
[45] Date of Patent: Nov. 19, 1985

[54] OPTICAL INFORMATION PROCESSOR

[75] Inventors: Takeshi Maeda, Kokubunji; Yoshito Tsunoda, Mitaka; Takakazu Huno, Tachikawa; Masahiro Takasago; Yasumitsu Mizoguchi, both of Odawara, all of Japan

[73] Assignee: Hitachi, Ltd., Tokyo, Japan

[21] Appl. No.: 490,165

[22] Filed: Apr. 29, 1983

[30] Foreign Application Priority Data

Apr. 30, 1982 [JP] Japan .................................. 57-71233

[51] Int. Cl.$^4$ ............................................... G11B 7/00
[52] U.S. Cl. .................................................... 369/44
[58] Field of Search ...................... 369/44, 45, 46, 48, 369/54, 116; 346/76 L

[56] References Cited

U.S. PATENT DOCUMENTS 4,363,116 12/1982 Kleuters et al. ...................... 369/44

Primary Examiner—Donald McElheny, Jr.
Attorney, Agent, or Firm—Antonelli, Terry & Wands

[57] ABSTRACT

An optical information processor records predetermined information along a track on a recording medium through the irradiation of a light beam intensity-modulated in accordance with the predetermined information. A tracking signal obtained when the light beam traces the track, is compared with first and second preset values which define a predetermined range. When the tracking signal departs from the predetermined range, the intensity modulation of the light beam or the recording operation is stopped, thereby preventing data destruction which otherwise occurs due to the digression of the light beam from the track.

7 Claims, 19 Drawing Figures

FIG. 4
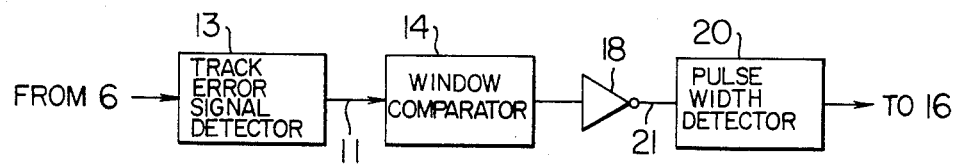
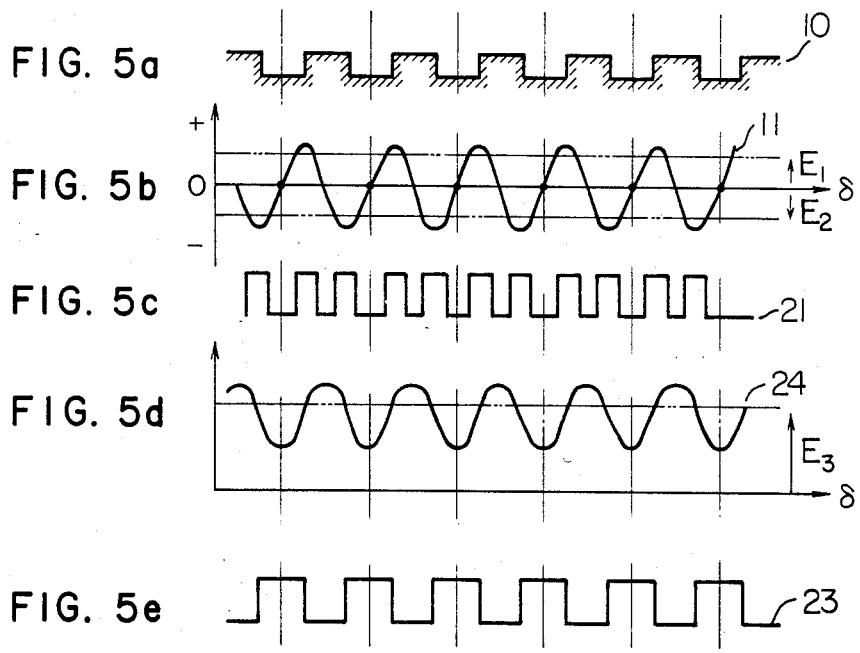
FIG. 5a
FIG. 5b
FIG. 5c
FIG. 5d
FIG. 5e

FIG. 6
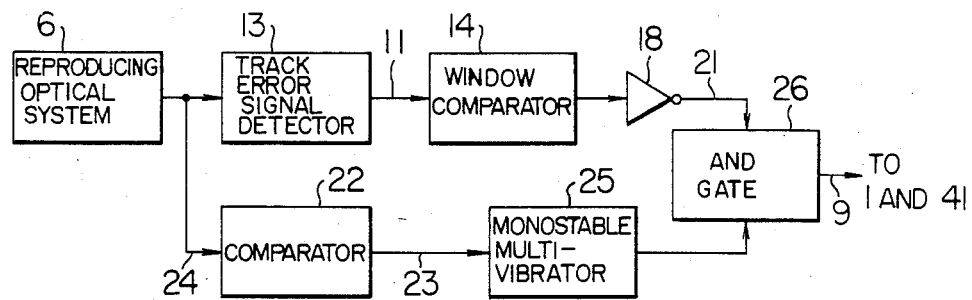
FIG. 7
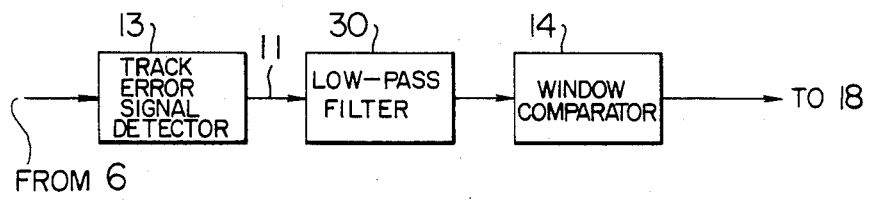
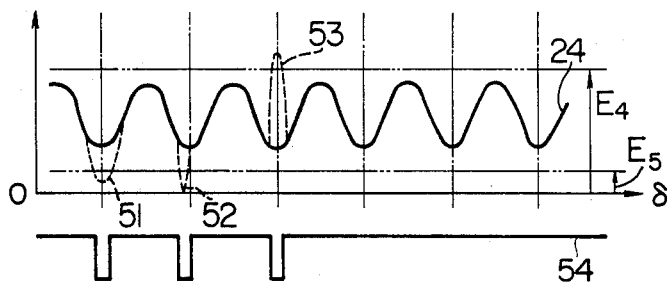
FIG. 8a
FIG. 8b

OPTICAL INFORMATION PROCESSOR

BACKGROUND OF THE INVENTION

The present invention relates to an optical information processor such as a digital optical disc, and more particularly to an optical information processor which can prevent data from being destroyed due to the digression of a light spot from a track.

In a digital optical disc, the digression of a light spot from a track being traced causes serious consequences, as compared with similar digression in a conventional commercial optical disc (that is, an optical video disc or a PCM audio disc). When the tracking error occurs in a recording period, not only data to be recorded is lost, but also previously recorded data is destroyed since the former is erroneously superposed on the latter. In order to prevent such troubles, it is very important to detect a tracking error with high reliability.

SUMMARY OF THE INVENTION

It is an object of the present invention to provide an optical information processor which includes a digression detecting means capable of surely detecting the digression of a light spot from a track with high reliability, thereby preventing data destruction.

In order to attain the above object, according to the present invention, a track error signal indicating the digression of a light spot from a track is compared with first and second preset values defining a predetermined range, and the recording of information is stopped when the track error signal departs from the predetermined range.

BRIEF DESCRIPTION OF THE DRAWINGS

The present invention will be apparent from the following detailed description taken in conjunction with the accompanying drawings, in which:

FIG. 4 is a block diagram showing a main part of another embodiment of an optical information processor according to the present invention;

FIGS. 5a to 5e are a sectional view and waveforms for explaining still another embodiment of an optical information processor according to the present invention;

FIG. 6 is a block diagram showing the construction of the still another embodiment;

FIG. 7 is a block diagram showing a main part of a further embodiment of an optical information processor according to the present invention;

FIGS. 8a and 8b are waveform charts for explaining a furthermore embodiment of an optical information processor according to the present invention;

DESCRIPTION OF THE PREFERRED EMBODIMENTS

Now, the present invention will be explained on the basis of embodiments.

A digital optical disc on which additional recording is possible, comprises a disc driving unit and a controller as fundamental units for making additional recording. The driving unit includes an optical head, means for moving the optical head, a rotating system, a control circuit for controlling a mechanism part, and an interface circuit between the driving unit and the controller. The controller issues instructions to the driving unit to drive the mechanism part and the optical head of the driving unit in accordance with a predetermined procedure and to process both a signal to be recorded in the optical disc and a signal reproduced from the optical disc. In a digital optical disc of this kind proposed in U.S. patent application Ser. No. 443,399 filed on Nov. 22, 1982 (or European Patent Application No. 8211097.1 filed on Nov. 25, 1982), it is impossible to erase data previously recorded, unlike a conventional magnetic disc. The reason is because recording data is recorded in a recording medium (for example, a metal film) vapor-deposited on a disc surface in such a manner that a laser beam having its intensity modulated in accordance with the recording data impinges upon the recording medium to thermally form holes or pits therein. Accordingly, it is required to prevent the data from being erroneously recorded at places other than a predetermined place which is usually on a track called guide groove or in some cases on a virtual rotational path on which a light spot moves relative to the rotation direction of the disc. The track pitch on an optical disc is about 1.6 μm which is smaller than the track pitch on a conventional magnetic disc. Therefore, a light spot has to be positioned on a desired track with high accuracy. Even when the light spot digresses from the track only a little, a large amount of data will be destroyed.

Figure 1:
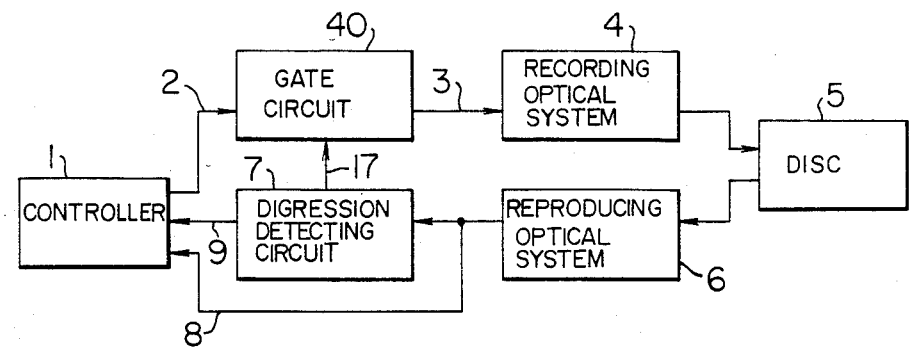
FIG. 1 is a block diagram showing an embodiment of an optical information processor according to the present invention.

FIG. 1 is a block diagram showing the construction of an embodiment of the present invention which can prevent such data destruction. Referring to FIG. 1, a signal 2 to be recorded or a signal obtained by modulating unprocessed data is supplied from a controller 1 to a gate circuit 40. An output signal 3 from the gate circuit 40 is supplied to a recording optical system 4 which is constructed by a light source, an optical path for guiding light from the light source to a disc 5, and an objective lens for focussing the light on the surface of the disc 5. The recording optical system 4 converts the signal 3 into a change in light intensity to form information pits in the disc 5. On the other hand, in a reproducing optical system 6 which is constructed by an optical element for taking out light reflected from or transmitted through the disc 5 and a photodetector for receiving light from the optical element, laser light reflected from or transmitted through the disc 5 is received by the photodetector, and information recorded in the optical form of information pits and a guide groove or the like is read out in the form of a change in intensity of reflected or transmitted laser light. The information thus read out is sent to a digression detecting circuit 7 and simultaneously sent as a reproduced signal 8 to the controller 1. In the controller 1, only an information signal is extracted from the reproduced signal 8, and the extracted information signal is pulse-shaped and then applied to a demodulator to form a data signal. On the other hand, in the digression detecting circuit 7, only a signal suited for detecting the digression of a light spot from a track is extracted from the reproduced signal 8 to detect the digression from track which will be explained later.

In order to prevent data destruction, according to the present invention, the gate circuit 40 is controlled by an output signal 17 from the digression detecting circuit 7 (which signal is generated when the digression from track occurs) so that the signal 2 is prevented from forming the output signal 3 of the gate circuit 40 unconditionally. That is, when the tracking error occurs, a recording operation is stopped. Simultaneously, a signal 9 indicating the digression from track is generated and applied to the controller 1. The signal 9 indicates to the controller 1 that the digression from track occurs and the gate circuit 40 is closed. When applied with the signal 9, the controller 1 causes an operation for recovery from erroneous recording. Such an erroneous recording has to be preferentially processed. The recovery from erroneous recording is performed in the following manner. Since a portion of recording data is lost due to the tracking error, the data portion is again recorded in a track sector other than a sector where the tracking error occurred. In a certain case, the system is returned to a reproducing operation and the sector where the digression from track has occurred is read. If the information read from that sector is useful, recording is again continued.

In this manner, according to the present invention, data destruction due to the digression from track can be prevented.

Figure 2A:
FIGS. 2a and 2b are a sectional view and a waveform chart for explaining a relation between tracks and a track-error signal.
Figure 2B:
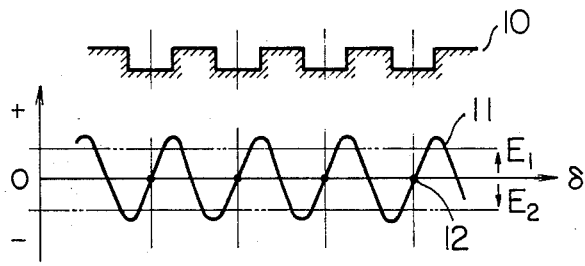

The present embodiment will be explained in more detail. In FIGS. 2a and 2b for explaining the present invention, FIG. 2a shows the cross section of tracks (guide grooves in the illustrated case) recorded on the disc and FIG. 2b shows a waveform of a track error signal. When a light spot is irradiated on one of tracks such as shown in FIG. 2a and moves in the radial direction of the track, the tracking signal 11 as shown in FIG. 2b indicating the digression of the center of the light spot from the center of the track is generated depending on the moving distance δ of the light spot. The track error signal 11 can be detected by various methods, that is, a method disclosed in Japanese Patent Application Laid-Open No. 50954/74 in which two auxiliary light spots are used, another method disclosed in Japanese Patent Application Laid-Open No. 60702/74 in which diffracted light is used, and a further method disclosed in Japanese Patent Application Laid-Open Nos. 94304/74 and 68413/75 in which a light spot is caused to meander for a track. These methods are described in detail in the previously referred U.S. patent application Ser. No. 443,399. In any one of these methods, a track error signal has such a waveform as shown in FIG. 2b. Referring to FIG. 2b, a black circle 12 indicates a pull-in point of a tracking servo system which point corresponds to the center of a track. A window comparator is provided to judge the level of the signal 11. When the level of the signal 11 lies between positive and negative levels $E_1$ and $E_2$ indicated by two-dot-dash lines, the output of the window comparator has a logical level of "1". When the level of signal 11 lies outside a range defined by the levels $E_1$ and $E_2$, the output of the window comparator has a logical level of "0". Thus, the digression from track can be detected on the basis of the output of the window comparator.

Figure 3:
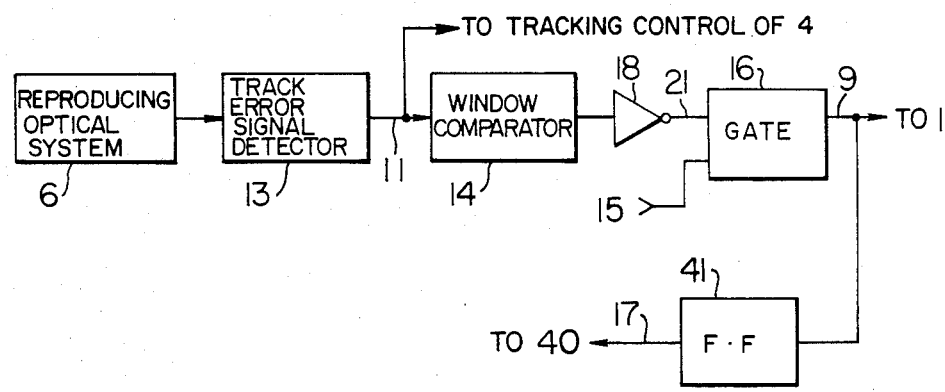
FIG. 3 is a block diagram showing the circuit configuration of the digression detecting circuit shown in FIG. 1.

FIG. 3 shows an example of the digression detecting circuit 7 shown in FIG. 1. Referring to FIG. 3, the reproduced signal from the reproducing optical system 6 is applied to a track error signal detector 13 which in turn delivers a track error signal 11. The track error signal 11 is applied to tracking control means of the recording optical system such as a light beam deflector (not shown) to control the position of a light spot so that the light spot follows a track. As mentioned previously, the detection of track error signal is well known, and therefore detailed explanation of the track error signal detector 13 is omitted. The signal 11 is applied to a window comparator 14. When the level of the signal 11 departs from a range defined by specified positive and negative levels, the output of the window comparator 14 takes a logical level of "0" so that the digression from track can be detected. Preferably, the specified level range may be selected such that the signal 11 has an approximately linear form over that range. However, the output of the window comparator takes a logical level of "1" even when the light spot is placed between tracks. Therefore, it is necessary to use a signal 15 indicating that the light spot is placed on a track. A control signal for opening and closing a tracking servo system may be used as the signal 15. In order to record/reproduce information, it is usually required to place the light spot on a track. That is, it is necessary to perform a tracking operation. When the tracking operation is performed, the servo system is closed to place the light spot in the vicinity of the target point 12. In a usual state or a normal state where the digression from track is not generated, the light spot is positioned in the vicinity of the target point, and the signal 15 indicating the closing condition of the servo system takes a level of "1". Accordingly, when the signal 15 has a level of "1", the tracking operation is being performed, and a condition for detection of the digression from track is satisfied. When the light spot digresses from a track for any cause, the output of the window compartor 14 takes a level of "0" so that an inverter 18 applied with the output of the window comparator delivers an output 21 having a level of "1" and the output 21 passes through a gate 16 to form a digression indicating signal 9 which is delivered from the gate 16. Since the signal 9 instantaneously takes a logical level of "1", the signal 9 is applied to a flip-flop 41 to set the flip-flop 41 by the leading edge of the signal 9. The output of the flip-flop 41 is used as the control signal 17 for controlling the gate circuit 40 so that the passage of the recording signal 2 therethrough is controlled. With the above-mentioned circuit construction, it is possible to detect the digression from track, thereby stopping a recording operation on the basis of the digression indi-cating signal and informing the controller 1 that the digression is detected and the recording operation is stopped.

The principle of the present invention for detecting the digression from track has been explained in the foregoing. In some cases, however, when the track error signal 11 is actually observed in the state where the servo system is closed, it is found that the signal 11 may include a waveform which exceeds the preset level of the window comparator for a short time due to dusts or flaws on the disc. In such cases, the recording operation may be erroneously stopped not withstanding tracking is normally performed. Accordingly, a method for preventing erroneous detection of the digression from track is desired.

FIG. 4 shows in block diagram a main part of another embodiment of the present invention. This embodiment can prevent the above-mentioned erroneous detection.

Referring to FIG. 4, the disturbance of the track error signal 11 caused by dusts or flaws on the disc is detected by the window comparator 14 which in turn delivers a pulse signal having a small pulse width. The pulse signal is applied to a pulse width detector 20 by which a pulse signal having a width not longer than a predetermined time interval is prevented from being applied to the gate 16 shown in FIG. 3. The predetermined time interval depends upon the rotational frequency of the disc. For example, in the case where the rotational frequency of the disc is 4 Hz, the time interval is selected to be 100 to 200 $\mu$s. The pulse width detector 20 can be constructed by a monostable multivibrator which is set by the leading edge of the output signal 21 from the inverter 18 to produce an output of "1" level during the predetermined time interval and an AND gate which is applied with the signal 21 and an inverted one of the output of the multivibrator. Thus, the malfunction due to the dusts or flaws can be prevented.

FIGS. 5a to 5e are waveforms for explaining still another embodiment of the present invention which can prevent the erroneous detection. In more detail, FIG. 5a shows a cross section of a disc as in FIG. 2a, FIG. 5b a waveform of a track error signal 11 as in FIG. 2b, FIG. 5c an inverted signal 21 of an output from the window comparator 14 for detecting the track error signal 11 by the use of levels $E_1$ and $E_2$, and FIG. 5d a signal 24 which indicates the total quantity of light and is included in a reproduced signal read out of the disc by the reproducing optical system 6.

The term "total quantity of reflected light" means the total quantity of light passing through the aperture of a lens which has a specified numerical aperture to focus the reflected light. The light quantity of this kind is used in reproducing an information signal recorded in the disc. The information signal is obtained in such a manner that a light flux having passed through the aperture of the lens is focussed on the light receiving surface of a single photodetector to be converted into a photocurrent. In another manner, the light flux impinges on a photodetector having a plurality of separate light receiving surfaces and photocurrents from the respective light receiving surfaces are summed up or the photocurrents are converted into voltages to be summed up. The current or voltage signal thus obtained is used as the above-mentioned signal 24 indicating the total quantity of reflected light.

The signal 24 and the track error signal 11 has a 90 phase difference in AC component therebetween when a light spot traverses a track. Therefore, if the level of the signal 24 discriminated by a comparator using a threshold level $E_3$, a signal 23 as shown in FIG. 5e is obtained. The threshold level $E_3$ is selected such that opposite edges of level "1" of the signal 23 approximately correspond to the positive and negative peaks of the signal 11. In the case where a light spot digresses from a track, the signal 23 assumes a level of "1" when the signal 21 is raising up and a level of "0" when the signal 21 falls down.

The digression from track can be detected on the basis of the variation of the signal 23 with time. FIG. 6 shows in block diagram the still another embodiment of the present invention. Referring to FIG. 6, the signal 24 indicative of the total light quantity is produced by the reproducing optical system 6 and is compared with the level $E_3$ by a comparator 22. The comparator 22 delivers the output signal 23 which takes a level of "1" when the level of the signal 24 is smaller than $E_3$. The signal 23 is applied to a monostable multivibrator 25 which in turn delivers an output having a pulse width equal to a specified period from the falling edge of the signal 23. The output from the multivibrator and the signal 21 from the inverter 18 are applied to an AND gate 26 to produce a logical product thereof, thereby forming a digression indicating signal 9. Thus, even when the track error signal 11 takes the form of a large pulse due to dusts or flaws on the disc, it is prevented to erroneously detect the digression from track. Further, since the signal 23 is one indicating that a light spot is placed on a track, the signal 23 can be also used as the signal 15 shown in FIG. 3.

Further, a circuit arrangement shown in FIG. 7 can also be used to prevent the erroneous detection. FIG. 7 is a block diagram showing a main part of a further embodiment of the present invention. Referring to FIG. 7, the track error signal 11 is applied to the window comparator 14 through a low-pass filter 30. Accordingly, a pulsated signal having a short width is prevented from entering the comparator 14. Though the cut-off frequency of the filter 30 is determined depending on the pulse width and frequency band of the short pulsated signal reproduced from the disc, it can be actually determined considering a substrate material used for the disc, the manufacturing process of the disc and the user's maintenance of the disc.

Figure 9:
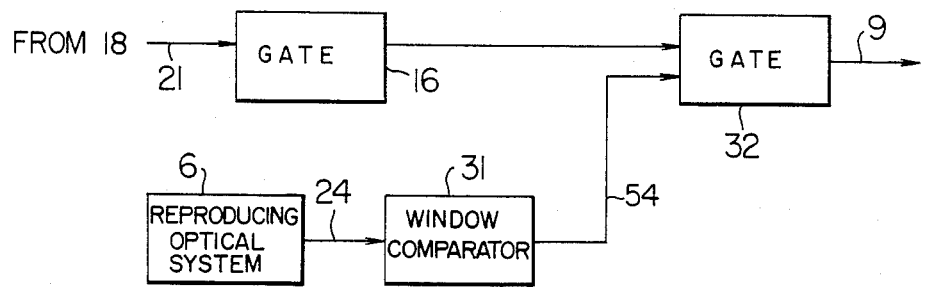
FIG. 9 is a block diagram showing the furthermore embodiment.

An additional embodiment of the present invention which can prevent the erroneous detection, will be explained with reference to FIGS. 8a, 8b and 9. FIGS. 8a and 8b are waveforms for explaining the present embodiment, and FIG. 9 is a block diagram showing a main part of the present embodiment. Large defects such as dusts or flaws on the disc cause a great change not only in a track error signal but also in a signal 24 indicative of the total light quantity as has been explained with reference to FIG. 5d. That is, when a light spot traverses a track having dusts or flaws, the signal 24 changes as indicated by broken lines 51, 52 and 53 in FIG. 8a. Light impinging on the dusts or flaws is usually scattered. For an objective lens having a specified numerical aperture, when the scattering angle at the dusts or flaws becomes greater than an angle determined from the numerical aperture of the objective lens, the quantity of light passing through the objective lens decreases so that the level of the signal 24 becomes lower than usual levels, as indicated by the broken lines 51 and 52. The dusts may contain highly reflective particles. In this case, the level of the signal 24 becomes higher than the usual levels, as indicated by the broken line 53. Referring now to FIG. 9, the signal 24 is applied to a window comparator 31 to produce an output signal which takes a level of "1" when the level of the signal 24 falls within a range from a level $E_4$ to a level $E_5$ and a level of "0" when the level of the signal 24 lies outside that range (see a signal 54 shown in FIG. 8b). The signal 54 is applied to a gate 32 together with the output of the gate circuit 16 which detects the digression from track on the basis of a track error signal. The gate 32 produces the logical product of these inputs, thereby preventing the erroneous detection. Though the levels $E_4$ and $E_5$ are determined depending on the disc used, the level $E_4$ has to be made greater than the level of the output of a photodetector when a light spot is placed between tracks, and the level $E_5$ has to be made smaller than the level of the output of the photodetector when the light spot is placed on a track.

Next, explanation will be made on an error correcting method when the digression from track occurs.

Figure 11:
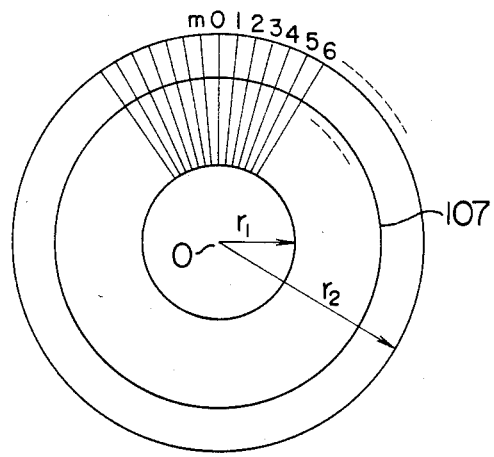
Figure 12:
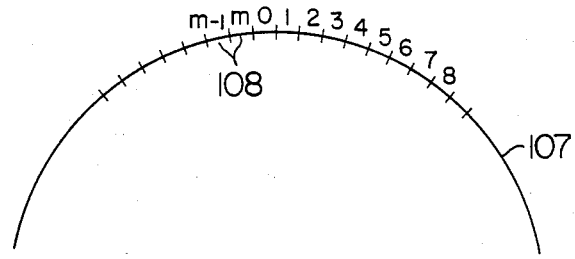

FIG. 11 is a front view showing an optical disc. Referring to the figure, an area from a radius $r_1$ to a radius $r_2$ is used as a recording area. Recording tracks are concentrically or spirally arranged at pitch intervals of 1.6 μm in the radial direction of the disc. Each track is equally divided along the circumference thereof into (m+1) regions. The region thus obtained is used as a minimum unit for processing recording information, and is called a sector. Accordingly, position information indicating the position of recorded information at the optical disc includes a track number and a sector number. FIG. 12 is an enlarged view showing the vicinity of the 0th sector of any track 107 shown in FIG. 11. Recording is made on the track 107 along a circumferential direction of the optical disc in the order of the 0th sector, 1st sector, 2nd sector and so on. The last m-th sector and a specified number of sectors therefore are vacant sectors. In an ordinary recording state, no information is recorded in the vacant sectors. Accordingly, the number of those sectors on one track where information can be recorded, is equal to m+1 minus the number of vacant sectors. In FIG. 12, the (m−1)th and m-th sectors are vacant sectors 108.

Figure 10:
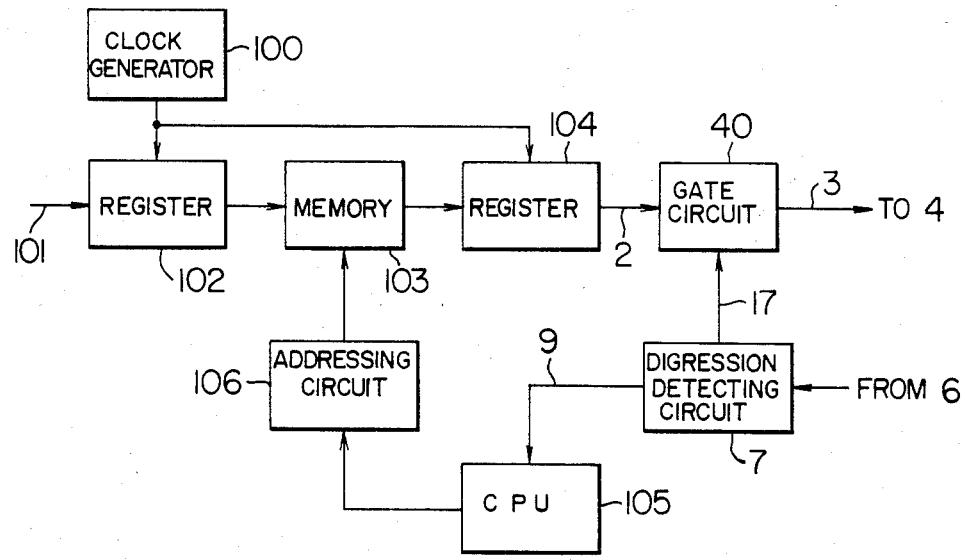
FIGS. 10 to 13 are views for explaining an information recording method and an error correcting method according to the present invention.

An information recording method and an error correcting method will now be explained with reference to the block diagram of FIG. 10. Referring to FIG. 10, information 101 to be recorded is modulated by a modulator (not shown) at each quantity corresponding to one sector. Pieces of the modulated information corresponding to sectors are taken into a register 102 in accordance with a clock signal from a clock generator 100.

Figure 13:
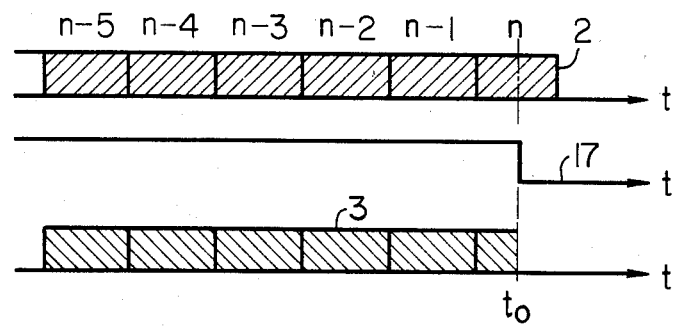

Each piece of the modulated information is stored in a memory 103 in accordance with an address sent out from an addressing circuit 106 for specifying addresses of the memory 103. The address sent out from the addressing circuit 106 is specified by a computer 105 which may be, for example, a commercially available microcomputer. When information to be recorded has been stored in the memory 103, commands are issued to the addressing circuit 106 in accordance with a program stored in the computer 105 so that the respective pieces of the information stored in the memory 103 are successively supplied to a register 104 and then supplied as a recording information signal 2 to the gate circuit 40 in accordance with the clock signal from the clock generator 100. Thus, the recording information signal 2 is sent out from the register 104 in a time sequential fashion as indicated by a time chart of FIG. 13. In FIG. 13, each of hatched regions represents a piece of information corresponding to one sector.

When the digression from track occurs at a time moment $t_0$, then, the digression detecting circuit 7 generates the signal 17 for controlling the gate circuit 40 so that a recording signal 3 otherwise applied to the recording optical system 4 is cut off at the time moment $t_0$. At the same time, the digression indicating signal 9 is supplied from the digression detecting circuit 7 to the computer 105. Since the computer 105 stores therein an address of the memory 103 specified at the time moment $t_0$, a piece of information for the n-th sector where the recording operation is stopped can be again read from the memory 103 and the read information is recorded in one of the vacant sectors 108 shown in FIG. 12. Incidentally, a piece of information which is to be recorded in the (n+1)th sector in accordance with an information arrangement in the memory 103, is recorded in the (n+1)th sector in accordance with an ordinary procedure.

What is claimed is:

1. An optical information processor comprising a recording medium which has tracks along each of which predetermined information is optically recorded and reproduced, means for recording including means for modulating the intensity of a light beam and for irradiating said recording medium with the light beam, light receiving means for receiving the light beam after the irradiation of said recording medium thereby, tracking signal generator means for generating on the basis of an output from said light receiving means a tracking signal which reflects a state of trace of one of said tracks by the light beam, and tracking control means for controlling the irradiation position of the light beam on said recording medium in accordance with said tracking signal so that the light beam correctly follows the track, first means for comparing said tracking signal with first and second preset values defining a predetermined range to produce an output signal indicating that said tracking signal departs from said predetermined range, and second means for stopping the intensity-modulation of the light beam in accordance with the output signal of said first means.

2. An optical information processor according to claim 1, wherein said first means includes comparator means for comparing said tracking signal with said first and second preset values to convert said tracking signal into a binary signal output having high and low levels, gate means for receiving the output of said comparator means and a track signal indicating that the light beam is placed on the track to control the passage of the output of said comparator means through said gate means in accordance with the track signal, and control signal generating means for generating in accordance with the output from said gate means a control signal which controls the operation of said second means.

3. An optical information processor according to claim 2, further comprising detector means provided between said comparator and gate means for receiving the output of said comparator means to deliver a high-level signal to said gate means when the duration time of the high level in the output of said comparator means exceeds a predetermined level.

4. An optical information processor according to claim 1, wherein said first means includes comparator means for comparing said tracking signal with said first and second preset values to convert said tracking signal into a binary signal output having high and low levels, additional comparator means for comparing a predetermined value with a signal included in the output of said light receiving means which represents the total quantity of the light beam and producing a signal indicating that the light beam is placed on the track, output generating means for generating an output when the output of said additional comparator means falls, gate means for receiving the output of said comparator means and the output of said output generating means to control the passage of the output of said comparator means through said gate means in accordance with the level of output of said output generating means, and control signal generating means for generating in accordance with an output from said gate means a control signal which controls the operation of said second means.

5. An optical information processor according to claim 2, further comprising filter means for passing only a low-frequency component of said tracking signal, said tracking signal being applied through said filter means to said comparator means.

6. An optical information processor according to claim 2, further comprising additional comparator means for comparing, a signal included in the output of said light receiving means which represents the total quantity of the light beam with third and fourth preset values defining a predetermined range and for converting the total quantity representing signal into a binary signal output having high and low levels, and additional gate means provided between said gate means and said control signal generating means for receiving the output of said gate means and the output of said additional comparator means to supply the output of said gate means to said control signal generating means in accordance with the level of the output of said additional comparator means.

7. An optical information processor according to claim 1, wherein each of the tracks provided on said recording medium has a region on which information whose recording on another region of said track is stopped by said second means can be again recorded.

* * * * *